United States Patent [19]
Richter et al.

[11] 3,943,250
[45] Mar. 9, 1976

[54] METHOD AND PHARMACEUTICAL PREPARATIONS FOR TREATING AND PREVENTING PHYSIOLOGICAL DISTURBANCES IN VERTEBRATES, CAUSED BY MOLDS AND YEASTS

[76] Inventors: Hans K. Richter, Ahornstrabe 10, 8094 Reitmehring; Dietrich K. Lüdeling, Ostpreussenstr. 5, 819 Wolfratshausen, both of Germany

[22] Filed: Aug. 27, 1973

[21] Appl. No.: 391,546

[30] Foreign Application Priority Data
Sept. 7, 1972  Germany............................ 2243982

[52] U.S. Cl. ............................................. 424/249
[51] Int. Cl.$^2$ A01N 9/00; A01N 9/22; A61K 31/53; A61L 13/00
[58] Field of Search ................................... 424/249

[56] References Cited
OTHER PUBLICATIONS

Schmidt et al., Arch. Biochem. Vol. 26 (1950) pp. 15–25.
Weuffen et al., Arzneimittel–Fourschung, Vol. 11 (1961) pp. 99–102.
Ortel et al., Pharmazie, Vol. 14, (1959) pp. 204–214.
Weuffen et al., Arzneimittel–Forschung, Vol. 9, (1959) pp. 365–368.
Chemical Abstracts 75:40400k (1971).

Primary Examiner—Jerome D. Goldberg
Assistant Examiner—D. W. Robinson
Attorney, Agent, or Firm—Kenyon & Kenyon

[57] ABSTRACT

Hexamethylenetetramine rhodanide together with conventional carriers and optionally vitamins and mineral salts is internally administered to mammals for treating and preventing herd sterility.

5 Claims, No Drawings

METHOD AND PHARMACEUTICAL PREPARATIONS FOR TREATING AND PREVENTING PHYSIOLOGICAL DISTURBANCES IN VERTEBRATES, CAUSED BY MOLDS AND YEASTS

BACKGROUND OF THE INVENTION

1. Field of the Invention

The invention relates to a method and pharmaceutical preparations for treating and preventing physiological disturbances in vertebrates, caused by molds and yeast, using hexamethylenetetramine rhodanide.

Furthermore, the invention relates to the use of hexamethylenetetramine rhodanide as antimycotic and mycocidal compositions containing hexamethylenetetramine rhodanide as active ingredient.

2. Description of the Prior Art

Hexamethylenetetramine rhodanide is known as a bactericidal compound. It serves e.g. in veterinary medicine for treating bacterial infections. It is mainly used in the case of coli infections. Furthermore, it is known that hexamethylenetetramine rhodanide has an antiallergic activity. However, it was not known that hexamethylenetetramine rhodanide also has a strong mycocidal activity.

Moldy feed causes considerable losses in animal breeding. As an example the "moldy corn disease", the "turkey X-disease" and the infection by Aspergillus flavus are mentioned.

Molds, yeasts and their spores are eaten by animals together with the feed and get into the various organisms via the digestive tract, where they cause various diseases. For instance, it is known that animal feed grown in soils rich in putrefactive germs lead to dyspermia of bulls and affect the quality of the sperma. In this connection it has further been found that molds and yeasts cultivated from the ejaculates of bulls are identical with the molds and yeasts contained in the animal feed. Recent mycological tests have shown that living yeast cells, e.g. Candida albicans, when taken in orally are absorbed by the mucosa of the small intestine and distributed in the organisms via the blood circulation and the lymphatic system and get thus into the sperma. Hence, it is proved that there is a connection between feed intoxications and the spermatic depression of bulls. In the case of female animals the genital mucus can similarly be infected by yeasts, molds or other mycetes which results in disturbances of fertility.

SUMMARY

It is an object of the invention to provide a method for treating and preventing physiological disturbances caused by molds and yeasts in vertebrates, in particular warm blooded animals such as mammals, poultry and fish.

It is a further object of the invention to provide pharmaceutical preparations for treating and preventing the above-stated physiological disturbances.

It has surprisingly been found that hexamethylenetetramine rhodanide when being internally, i.e. orally or parenterally, administered to vertebrates has a strong mycocidal activity. Examples of parenteral administration are the intramuscular, intravenous and subcutaneous administration.

Physiological disturbances include mycoses of inner organs such as the liver, the lung and the genital organs, and disturbances of fertility.

Culturing tests have shown that even in a concentration of 0.025 percent by weight hexamethylenetetramine rhodanide completely suppresses the growth of molds and yeasts such as species of Mucor, Geotrichum and Candida and other mycetes and kills these microorganisms.

According to the inventive method for the treatment and prophylaxis of mycoses vertebrates are internally administered an effective amount of hexamethylenetetramine rhodanide optionally together with pharmacologically acceptable carriers. Vertebrates that can be treated according to the inventive method are cattle, sheep, pigs, horses, goats, poultry such as hens and turkeys, and fish such as trouts and carps.

The pharmaceutical preparations of the invention for the treatment and prophylaxis may optionally also contain conventional mineral salts, vitamins, amino acids, flavorings, fillers and/or other additives.

Examples of carriers are water, salt solutions, animal feed such as animal proteins, oil cake, fats, cereals, dried potatoes, molasses, dried sugar beets, yeasts, dry green fodder and minerals such as vermiculite and diatomaceous earth.

Examples of vitamins which may additionally be contained in the pharmaceutical preparations of the invention are vitamins A, D, E and B. Examples of minerals are carbonates, phosphates, chlorides and sulfates of sodium, magnesium, calcium, cobalt and copper.

Hexamethylenetetramine rhodanide may be administered e.g. in the form of medicinal feed, premixes, licking blocks, injection preparations and aqueous solutions.

For preparing premixes hexamethylenetetramine rhodanide is uniformly distributed in a standard feed carrier. Examples of feed carriers are soy bean flour, corn oil, corn flour, barley, wheat and mineral mixtures such as vermiculite and diatomaceous earth. These premixes may, optionally, also contain the afore-mentioned vitamins and mineral salts.

In general, hexamethylenetetramine rhodanide is administered in a dosage of from 2 to 200 mg/kg, preferably of from 2 to 80, most preferably of from 10 to 20 mg/kg per day. Cattle having a body weight of 500 kg are generally administered of from 1 to 100 g, preferably 1 to 40 g and most preferably 5 to 20 g, per day and animal.

In the case of cattle having been administered the pharmaceutical preparations of the invention in the above-stated dosages for at least three weeks no molds or yeasts persorbed from the digestive tract could be detected when culturing the sperma and mucus.

It has been found that for cattle having an average body weight of 500 kg, a long term medication of from 5 to 10 g per animal and day is particularly successful. The detrimental effect of molds and yeasts, in particular with respect to disturbances of fertility, is eliminated without useful microorganisms present in the rumen of cattle being affected.

The pharmaceutical preparations of the invention are applied in particular to eliminate disturbances of fertility. Since there is a connection between herd sterility in the case of cattle and the infection of feed by mycetes they are particularly suited for combatting the herd sterility. The prophylactic application of these preparations is recommended for the above-stated purposes and for other indications if the animals run the risc of eating feed infected by mycetes.

Medicinal feed containing hexamethylenetetramine rhodanide as active ingredient is not taken by the animal as a medicine and thus permits a simple and practical prophylaxis and therapy. This applies the more as the administration is preferably effected in the form of long term medication and not as a massive dose.

The pharmaceutical preparations of the invention are administered to bulls in the form of a long term medication of from about 10 to 40, in particular 10 to 20 mg/kg. Pregnant cows are administered the medicinal feed preferably in a dosage of from 5 to 20 mg per day starting about 4 weeks before the calving and ending about 3 weeks after the calving, as a prophylaxis in order to combat herd sterility.

The following examples illustrate the invention but do not constitute a restriction:

EXAMPLE 1

Preparation to be added to animal feed infected by molds and yeast

| Ingredients | percent by weight |
|---|---|
| calcium carbonate | 17.00 |
| dicalcium phosphate | 38.00 |
| sodium magnesium calcium phosphate | 21.00 |
| sodium chloride | 4.20 |
| magnesium oxide | 4.10 |
| mixture of trace elements | 1.20 |
| vitamin premix of (A+B+E) for cattle | 0.85 |
| sodium bicarbonate | 7.10 |
| anise taste | 0.05 |
| hexamethylenetetramine rhodanide | 6.50 |
| | 100.00 |

EXAMPLE 2

Licking block

Licking blocks are prepared from the following components:

| Components | percent by weight |
|---|---|
| dried sugar molasses | 45 |
| granulated sodium chloride | 20 |
| stabilized animal fat | 1 |
| ground soy bean hulls | 20 |
| trace minerals and vitamins | 0.20 |
| hexamethylenetetramine rhodanide | 10 |
| rest moisture | |

EXAMPLE 3

Licking block

A dry mixture is prepared from 40 kg mixed phosphate having a small amount of crystallization water (containing 39 percent disodium phosphate, 33 percent dicalcium phosphate and 28 percent dimagnesium phosphate), 9 kg dicalcium phosphate having a small amount of crystallization water, 17 kg sodium chloride, 3.5 kg kaolin, 1 kg magnesium oxide and 10 kg hexamethylenetetramine rhodanide. This mixture is thoroughly blended with 30 l diluted aqueous milk sugar molasses (25 percent dried mass) in a concrete mixer. The obtained composition is subsequently cast into molds. It solidifies within 24 h to a solid block.

EXAMPLE 4

Injection solution

An injection solution is prepared from 10 percent by weight hexamethylenetetramine rhodanide and 90 percent by weight sterile physiological saline solution. This solution is filled into ampuls of 100 ml each.

EXAMPLE 5

Culture tests with hexamethylenetetramine rhodanide

Cultures of species of Mucor, Geotrichum and Candida were inoculated into culture media with or without the addition of hexamethylenetetramine rhodanide.

The nutrient media had the following composition (Art. 5448 Wurze-Agar of Messrs. Merck, Darmstadt):

| per liter: | | |
|---|---|---|
| | malt extract | 15.0 |
| | Universalpepton M66 | 0.78 |
| | D (+)-maltose | 12.75 |
| | dextrin | 2.75 |
| | glycerol | 2.35 |
| | dipotassium hydrogenphosphate | 1.0 |
| | ammonium chloride | 1.0 |
| | agar agar | 15.0 |
| | pH of the ready nutrient medium at a temperature of 30°C: 4.6 – 5.0 | |

The nutrient media with hexamethylenetetramine rhodanide contained:

0.8 percent hexamethylenetetramine rhodanide = 0.1 g 0.4 percent hexamethylenetetramine rhodanide = 0.05 g or 0.2 percent hexamethylenetetramine rhodanide = 0.025 g In all cases the nutrient media without the addition of hexamethylenetetramine rhodanide showed a strong growth of molds and yeasts, whereas the nutrient media with hexamethylenetetramine rhodanide did in no case show the growth of molds or yeasts but remained free of germs.

EXAMPLE 6

Influence on the sperma quality of bulls

Animal feed strongly infected by yeasts and molds (species of Mucor, penicillium, Geotrichum, Fusarium, Aspergillus, Candida etc., e.g. Mucor racemus tres., Geotrichum candidum link., Penicillium cyclopium, Aspergillus phoenicis, Absidia corymbifera, Fusarium javanicum, Cryptococcus laurentii, Cryptococcus albidus and Candida albicans) was fed to bulls. A group of 60 animals were orally administered 9.75 g hexamethylenetetramine rhodanide per day (150 g medicinal feed according to Example 1). A control group also comprising 60 animals only got the infected feed. After 100 days the sperma quality was examined. 59 of the animals treated showed no germs in the sperma. 54 of the animals of the control group showed germs in the sperma, whereas 6 animals were not affected.

What is claimed is:

1. A method of combatting in mammals herd sterility due to consumption of feed contaminated with mycetes causing herd sterility which comprises internally administering to said mammal hexamethylenetetramine rhodanide in an effective amount for combatting said herd sterility.

2. The method according to claim 1 wherein said dosage is from 2 to 200 mg/kg.

3. The method according to claim 1 wherein said dosage is from 2 to 80 mg/kg.

4. The method according to claim 1 wherein said dosage is from 10 to 20 mg/kg.

5. The method according to claim 1 wherein said hexamethylenetetramine rhodanide is administered together with a pharmacologically acceptable carrier.

* * * * *